Oct. 30, 1962     E. J. SCHUELLER     3,061,124
SELF-OPERATED BRAKING MECHANISM FOR AUTOMOTIVE TRAILERS
Filed Sept. 22, 1959     2 Sheets-Sheet 1
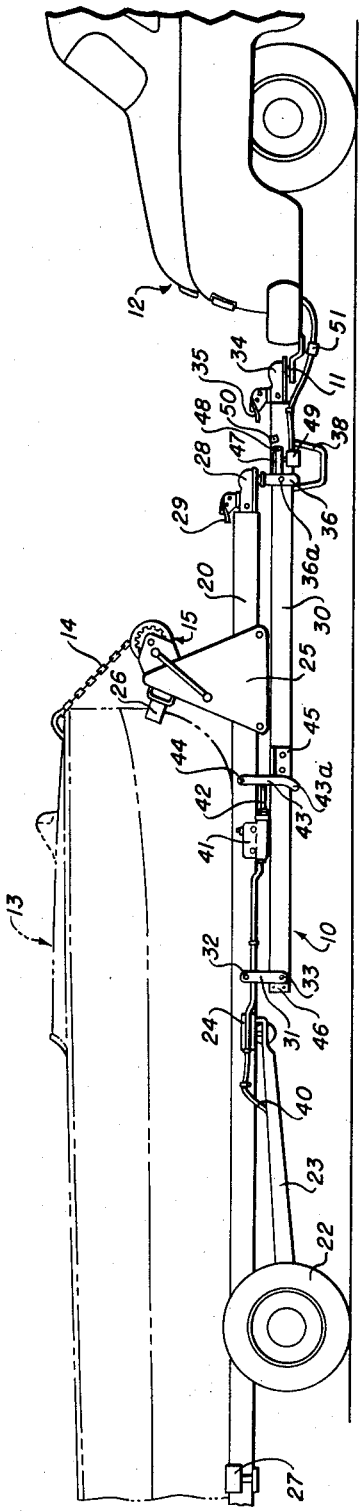
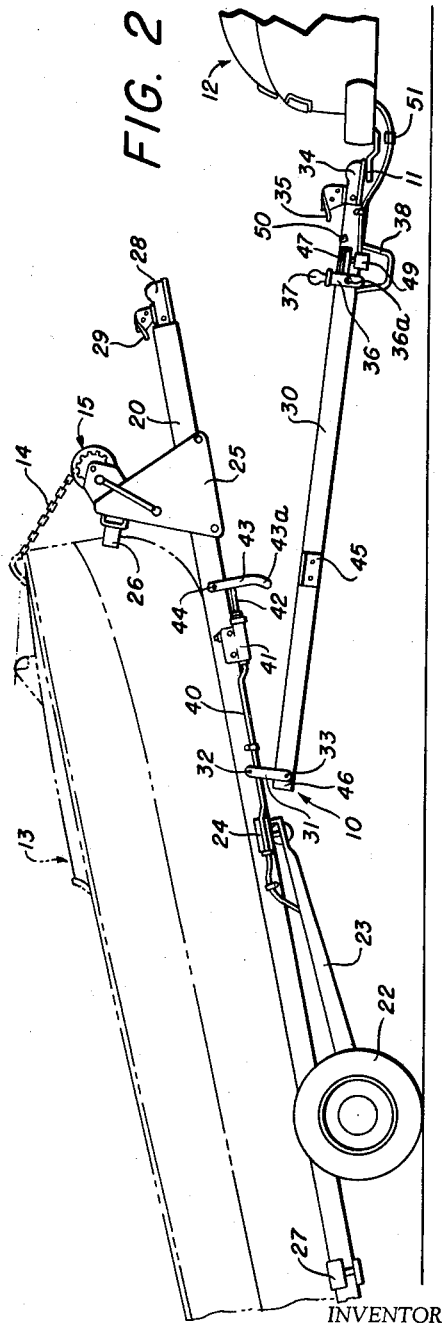
INVENTOR
EDWARD J. SCHUELLER
BY *J. William Freeman*
ATTORNEY Oct. 30, 1962     E. J. SCHUELLER     3,061,124
SELF-OPERATED BRAKING MECHANISM FOR AUTOMOTIVE TRAILERS
Filed Sept. 22, 1959     2 Sheets-Sheet 2

INVENTOR
EDWARD J. SCHUELLER

BY [signature]

ATTORNEY

United States Patent Office

3,061,124
Patented Oct. 30, 1962

3,061,124
SELF-OPERATED BRAKING MECHANISM FOR AUTOMOTIVE TRAILERS
Edward J. Schueller, 5746 Harterhome Drive, Akron 19, Ohio
Filed Sept. 22, 1959, Ser. No. 841,638
3 Claims. (Cl. 214—506)

This invention relates to the art of automotive trailers and in particular relates to an improved type of self-operated braking mechanism designed for use with automotive trailers.

In the art of trailer construction and particularly light weight trailers for use with automobiles, it has long been known that state regulations require braking mechanisms to be employed on such trailers if the weight of the same exceeds a certain amount.

In the past this requirement has been met by providing a braking mechanism on the trailer and having the operation of the same controlled from the interior of the automobile towing the same. The devices employed in this regard have normally been hydraulic brake mechanisms that were either electrically or otherwise operated from a position near the steering wheel.

While the above type of braking systems meet the requirements of the statutes regulating the operation of trailers, it is believed apparent that the same are subject to certain disadvantages.

First and foremost is the fact that the devices will not be operated unless actuated by the driver and it frequently happens that the driver, when confronted with an emergency situation, fails to have sufficient presence of mind to operate the trailer braking mechanism as well as the other mechanisms that must be operated to bring the car to a halt under emergency situations.

Secondly, it is believed apparent that in view of the fact that the braking mechanism is driver operated, that there will be instances where the same is operated incorrectly, with brakes oftentimes being applied on the trailer when not necessary and oftentimes not being applied when necessary.

As a third disadvantage, it is believed apparent that this type of connection would, at best, be expensive to install on the car of the user due to the fact that the same must be positioned interiorly of the car adjacent the steering apparatus. This connection, coupled with the external connections associated therewith normally puts the cost of such installation beyond the reach of the average purchaser.

As a still further disadvantage, it will be noted that the use of such a system would preclude interchangeability and would, thus, strictly limit the amount of rental use that could be made of trailers wherein brakes would be required.

It has been discovered that all of the aforementioned disadvantages can be obviated if the braking mechanism is automatically operated in response to certain impulses received from the towing car.

More specifically, it has been found that if the trailer braking mechanism is made to automatically operate upon operation of the car brakes, that it will not be necessary to have any operating mechanism provided interiorly of the towing automobile, since the operation of the braking system thereof will automatically result in operation of the trailer brakes in unison therewith.

For descriptive purposes, the improved braking system will be described as being inertia operated, with the inertia of the moving trailer causing automatic operation of the brakes upon operation of the car brakes. Thus, by providing a trailer frame that has relatively shiftable components, the inertia of the trailer will cause shifting of these component parts upon application of the car brakes to cause automatic application of the trailer brakes.

While this inertia principle of operation works properly during normal towing of the trailer in a forward direction, provision must also be made to prevent the operation of the trailer brakes during the time that the trailer is being backed up. Without such provisions, if the backing trailer hit a curb or other object, there would be a tendency for the brakes of the trailer to be applied, with the result that the car operator would be attempting to back up a trailer whose wheels were locked.

To prevent this, the invention also contemplates a provision for means for deactivating the trailer braking mechanism during the time that the automobile is being backed up.

Production of a low cost, interchangeable, self-contained braking unit for trailers having the above advantages accordingly becomes the principal object of this invention, with other objects thereof becoming more apparent upon a reading of the following brief specification, considered and interpreted in the light of the accompanying drawings.

Of the drawings:

FIGURE 1 is a side elevational view showing the position of the component parts during the time that the trailer is being backed up.

FIGURE 2 is a similar view to FIGURE 1 but showing the trailer mechanism being in a position for unloading the boat received thereon.

Figure 4:
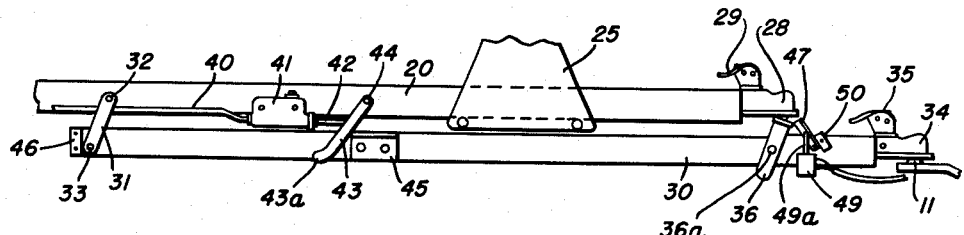
FIGURE 4 is a view similar to FIGURE 3 but showing the position of the component parts following the application of the car brakes.
Figure 5:
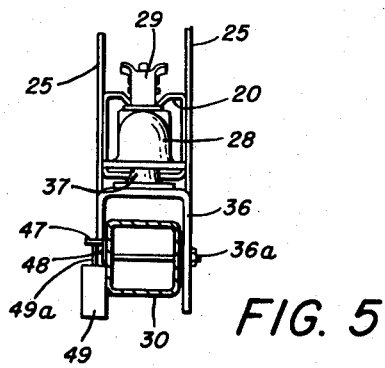
Figure 6:
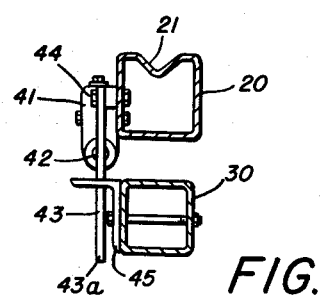
Figure 7:
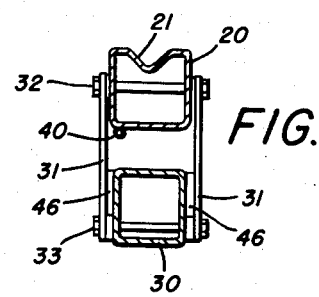

FIGURES 5, 6 and 7 are vertical sections taken on the lines 5—5, 6—6 and 7—7 of FIGURE 4, respectively.

Referring now to the drawings and in particular to FIGURES 1 and 2 thereof, the improved trailer, generally designated by the numeral 10, is shown secured to a towing ball 11, that is disposed adjacent the rearmost portion of an automobile 12, with the trailer 10 receiving thereon a boat 13 that is retained in placed by the usual chain 14 applied about the winch mechanism 15.

The improved trailer 10 employed to illustrate the principle of the invention is, as indicated above, a boat trailer and is of the type generally referred to in the trade as a "tipper-tongue" that utilizes two tongue members that are pivotable relatively of each other upon the release of the hitch so as to facilitate easier loading and unloading of the boat that is carried thereon. It is to be understood, however, that the "tipper-tongue" type of trailer is only representative of the types of trailers that the device could be employed with and further that the device can be employed with other types of trailers, such as vacation or house trailers, if desired.

The trailer 10, accordingly includes an elongate main frame 20 that is of generally rectangular cross-sectional configuration as shown in FIGURES 5 through 7 of the drawings, and which has a contoured top surface 21 within which the keel of the boat may be received during transport. A cross frame member is attached to the main frame 20 and extends transversely thereof so as to receive wheels 22, 22 thereon in known fashion, with stabilizer bars 23, 23 being shown connecting the outer portion of the transverse frame with the main frame 20 through a connecting lug 24 in known fashion. A stand 25 is secured to the forward end of the frame 20 to support the winch mechanism 15 and the front support 26, while rollers 27, 27 are provided rearwardly on frame 20 for support of the hull at points spaced from the frame 20.

A ball socket 28, having an actuator 29, is provided on the forward end of the frame 20 for cooperation with the auxiliary tongue, as will now be described.

Accordingly, an auxiliary tongue 30 of generally elongate configuration is shown disposed beneath the forwardmost portion of the main tongue 20 in aligned overlying relationship therewith, with the tongue 30 being permanently connected with respect to frame or tongue 20 by a pair of link arms 31, 31 that are rotatably pinned, as at 32 and 33, to the main tongue 20 and the auxiliary tongue 30, respectively. In this fashion, the tongues 20 and 30 can move from the condition of parallelism shown in FIGURE 1 to the condition of acute inclination shown in FIGURE 2 upon release of the actuator 29.

In addition to the aforementioned component parts, the tongue 30 also includes a ball receiving socket 34 having an actuator 35 so as to permit releasable reception around the towing ball 11 of the automobile. A U-shaped lug 36 is pivoted, as at 36a, to the frame 30 adjacent the socket 34, with the lug 36 having formed thereon a ball 37 that is designed to be received within socket 28, as clearly shown in FIGURES 1, 3 and 4 of the drawings. A U-frame 38 depends from the underside of the frame 30 for use in supporting the socket 34 above the ground when the trailer is not in use behind the automobile.

Figure 3:
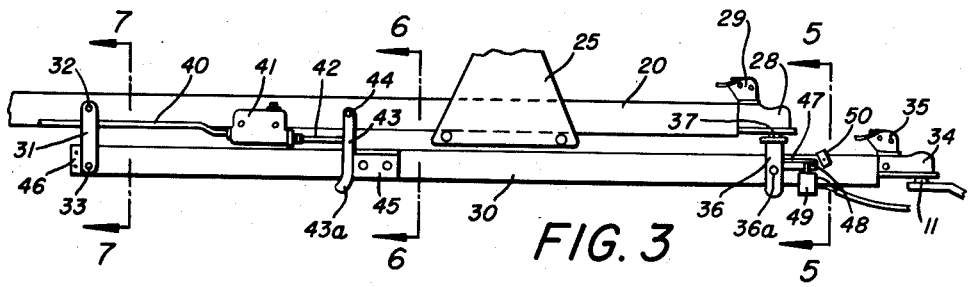
FIGURE 3 is a fragmentary elevation of the trailer and showing the position of the component parts during the normal towing of the trailer in the forward direction.

It will be seen, therefore, that when the component parts just described are in the position shown in FIGURE 3 that a parallelogram is defined by the frames 20, 30; links 31, 31; and lug 36, with the lug 36 being operatively associated with frame 20 by virtue of the fact that the ball 37 is received in the socket 28. Thus, this parallelogram just described can flex or move between the positions shown in FIGURES 3 and 4 upon the application of braking force, as will now be described.

The braking means employed in connection with this invention contemplate the use of the conventional hydraulic brake drums provided on the wheels 22, with the bands of the brakes being expanded upon the application of hydraulic pressure through line 40 from master cylinder 41, with both master cylinder 41 and line 40 being shown preferably associated with the main frame 20 as is evident from the drawings.

For the purpose of actuating the braking mechanism just described, the master cylinder 41 includes a projecting pin 42 that normally has its condition of maximum projection when the brakes are in the inoperative position shown in FIGURES 1, 2 and 3 of the drawings. The projecting end of the pin 42 is arranged for contact with an arm 43 that is pinned, as at 44, to the main frame 20 so as to be rotatable therearound. (See FIGURES 1, 2, 3, 4 and 6.) The lower depending portion of the just described arm 43 is contoured, as at 43a, so as to permit operative association with a flange 45 that is carried by the lower frame 30, with the curved portion 43a permitting camming of the arm 43 against the flange 45 when the component parts are moved from the position of FIGURE 2 to the position of FIGURE 1.

In addition to the component parts just described, the frame 30 is provided with plates 46, 46 that are provided on opposed faces thereof so as to limit the counterclockwise rotation of the link arms 31, 31 that serve to interconnect the frames 20 and 30 as has been described. Additionally, the U-shaped frame 36 preferably has its clockwise rotation selectively limited by virtue of a flange or lug 47 that is pinned, as at 48, to the auxiliary frame 30 so as to be rotatable between the positions of FIGURES 3 and 4 upon operation of a solenoid 49, with clockwise movement of the flange 47 being preferably controlled by a limit plate 50 that is fixed with respect to the lower frame 30 as is apparent in FIGURES 1 through 4 of the drawings.

In the preferred embodiment illustrated, the operation of the solenoid switch 49 is arranged so that the same has the pin 49a thereof normally extended to the position of FIGURE 4, with the pin 49a being retracted only when the automobile gears are placed in reverse. In this fashion, the normal operating condition will be shown in FIGURES 3 and 4, with the reverse or backing condition being shown in FIGURE 1.

It is believed apparent that the arrangement of the solenoid 49 is a matter of simplified wiring with respect to connection with the car and preferably the wiring would be arranged in such a fashion that the usual connector plug and socket arrangement 51 could be employed with one half of the separable socket 51 being connected to the automobile while the remaining half thereof will be permanently connected with respect to the trailer. In this fashion, the solenoid 49, as well as the running lights and directional signals of the trailer, could be permanently arranged for operation with the automobile. It is to be understood, however, that the use of the solenoid 49 is optional and could be dispensed with if a manual operation of the flange 47 was preferred.

In use or operation of the improved device, it will first be assumed that the component parts are positioned as shown in FIGURES 3 and 4, with the pin 49a of the solenoid 49 being extended so as to permit limited clockwise movement of the U-frame 36 around the auxiliary frame 30 and with the ball 37 thereof being connected in socket 28. In this condition and assuming that the towing ball 11 is moving to the right of FIGURES 3 and 4, a towing force will be applied on the frame 30 that will cause the same to move to the right and follow the ball 11. A similar force will be applied to the main frame 20 by virtue of the inability of the rings 31, 31 to move counter clockwise due to the presence of the limit plates 46, 46 and, accordingly, both the main and auxiliary frame will move to the right of FIGURES 3 and 4 of the drawings.

When the automobile brakes are applied, however, a force to the left will be applied against the auxiliary frame 30 and, at this time, the inertia along frame 20 will be to the right so that a clockwise rotation of links 31, 31 and frame 36 will occur to cause the frame 20 to move to the right as shown in FIGURE 4. During this movement to the right, the arm 43 will be pivoted around the frame 20 to cause depression of the projecting pin 42 with the consequent result that braking pressure will be automatically applied to the wheels 22.

When the braking pressure on the car is released, the inertia surge of the car will cause the component parts to resume the position shown in FIGURE 3, at which time the plunger 42 will automatically extend to its maximum projection condition so that arm 43 is again disposed in the substantially vertical position shown in FIGURE 3.

It will be seen from the foregoing how the parallelogram type of connection between the main and auxiliary frames permits the flange 45 to shift the arm 43 so as to cause energization of the master cylinder 41.

When it is desired to back the trailer, it is necessary that the just described shifting of the parallelogram be obviated and, accordingly, it is necessary that the flange 47 be positioned as shown in FIGURE 1 of the drawings. It is believed apparent that in this condition the parallelogram, defined by the frames 20 and 30, the links 31, 31 and the U-frame 36, is locked against movement by the limit plates 46, 46 and the flange 47. Accordingly, during this period of backing there can be no shifting of the frames 20 and 30 relatively of each other in a longitudinal direction, with the result that braking pressure cannot be applied due to the inability of the arm 43 to be pivoted around frame 20.

It is believed to be an important feature of this invention that the installation of the inertia operated braking system does not in any way effect the operation of the trailer. For example, it has been shown how the tipper mechanism thereof can operatively function as shown in FIGURE 2 due to the curved nature of the end 43a which permits release and re-engagement between the arm 43 and flange 45, as clearly shown in FIGURES 1 and 2 of the drawings. It will also be noted that this arrangement also prevents the car from being "pushed" by the trailer during movement downhill, for example.

While a full and complete disclosure of the invention has been set forth in accordance with the dictates of the patent statutes, it is to be understood that the invention is not intended to be so limited.

Thus, while the invention has been disclosed in connection with boat trailers of the tipper type, it is to be understood that the principle thereof has equal application in use with other types of trailer frames.

Accordingly, modifications of the invention may be resorted to without departing from the spirit hereof or the scope of the appended claims.

What is claimed is:

1. An inertia braked trailer which is towable by a towing vehicle, comprising; a main support frame of generally elongate configuration; a wheel and axle assembly carried by said main support frame; braking means operatively associated with said wheel and axle assembly and controlling rotation of said wheel relatively of said axle; an actuator mechanism carried on said main support frame and controlling operation of said braking means; an auxiliary frame of elongate configuration having a hitch mechanism adjacent one longitudinal end thereof for attachment to a ball carried on said towing vehicle; means for securing said auxiliary frame to said main frame for relative longitudinal movement therebetween; said means including a first elongate link arm respectively pivoted at its opposed ends to the remaining longitudinal end of said auxiliary frame and to an intermediate portion of said main frame; a second elongate link arm pivotally connected to said auxiliary frame adjacent said hitch mechanism and having a ball provided on the free end thereof; a ball socket carried adjacent one end of said main frame and being releasably engageable with said ball carried by said second link arm; the longitudinal spacing between said link arms being a multiple of the length of said arms whereby said main frame may be tipped about the first elongate link arm with respect to said auxiliary frame; means carried by said auxiliary frame and actuating said actuator mechanism of said brake means upon relative longitudinal shifting between said main and auxiliary frames; and locking means associated with at least one said link arm and being shiftable into and out of locking condition with said main and auxiliary frames being locked against relative shifting longitudinally of each other when said locking means are disposed in locking condition.

2. The device of claim 1 further characterized by the fact that said means for actuating said actuator mechanism is disposed inwardly from the opposed longitudinal ends of said auxiliary frame and includes an arm pivoted to one said frame member and being engageable with said actuator mechanism to actuate the same and a lug secured to the remaining said frame member and being engageable with said arm whereby said pivotal movement of said arm will occur upon longitudinal shifting between said main and auxiliary frames.

3. The device of claim 2 further characterized by the fact that said arm of said means for actuating said actuator mechanism projects beyond the frame member to which it is attached; said projecting end being curved.

References Cited in the file of this patent

UNITED STATES PATENTS

| | | |
|---|---|---|
| 2,114,279 | Claus | Apr. 19, 1938 |
| 2,134,931 | Salerno | Nov. 1, 1938 |
| 2,320,585 | Gill et al. | June 1, 1943 |
| 2,354,268 | McNamara | July 25, 1944 |
| 2,662,616 | De Lateur | Dec. 15, 1953 |
| 2,779,443 | Tucker | Jan. 29, 1957 |
| 2,823,817 | Holsclaw | Feb. 18, 1958 |
| 2,834,437 | Davids | May 13, 1958 |
| 2,954,104 | Schumate | Sept. 27, 1960 |
| 2,960,194 | Stromberg | Nov. 15, 1960 |
| 2,969,857 | Parkhurst | Jan. 31, 1961 |
| 2,973,839 | De Puydt | Mar. 7, 1961 |
| 3,007,552 | Eksergian | Nov. 7, 1961 |